United States Patent
Langer

(10) Patent No.: US 11,619,334 B2
(45) Date of Patent: Apr. 4, 2023

(54) FLUID COUPLINGS

(71) Applicant: Colder Products Company, Roseville, MN (US)

(72) Inventor: Elizabeth J. Langer, Minneapolis, MN (US)

(73) Assignee: Colder Products Company, Roseville, MN (US)

( * ) Notice: Subject to any disclaimer, the term of this patent is extended or adjusted under 35 U.S.C. 154(b) by 183 days.

(21) Appl. No.: 17/139,444

(22) Filed: Dec. 31, 2020

(65) Prior Publication Data

US 2021/0199223 A1   Jul. 1, 2021

Related U.S. Application Data

(60) Provisional application No. 62/955,783, filed on Dec. 31, 2019.

(51) Int. Cl.
*F16L 37/34* (2006.01)
*F16L 37/084* (2006.01)

(52) U.S. Cl.
CPC .......... *F16L 37/34* (2013.01); *F16L 37/0841* (2013.01)

(58) Field of Classification Search
CPC ........ F16L 37/34; F16L 37/32; F16L 37/0841
See application file for complete search history.

(56) References Cited

U.S. PATENT DOCUMENTS

| | | | | |
|---|---|---|---|---|
| 3,645,294 A * | 2/1972 | Allread | ................... | F16L 37/34 137/614 |
| 5,215,122 A * | 6/1993 | Rogers | ................... | F16L 37/34 251/149.6 |
| 5,494,073 A * | 2/1996 | Saito | ................... | F16L 37/34 251/149.6 |
| 5,546,985 A * | 8/1996 | Bartholomew | ......... | F16L 37/34 251/149.6 |
| 5,911,403 A * | 6/1999 | deCler | ................ | B67D 7/0294 251/149.6 |
| 6,161,578 A * | 12/2000 | Braun | ................ | F16L 37/0841 137/614.04 |
| 6,328,348 B1 * | 12/2001 | Cornford | ................ | F16L 37/34 285/305 |
| 6,681,803 B2 * | 1/2004 | Taneya | ................... | F16L 37/23 251/149.6 |
| 7,213,845 B2 * | 5/2007 | Sato | ................... | F16L 37/23 285/85 |
| 7,469,472 B2 * | 12/2008 | deCler | ................... | F16L 37/34 285/285.1 |

(Continued)

OTHER PUBLICATIONS

International Preliminary Report on Patentability in International Appln. No. PCT/US2020/067700, dated Jul. 14, 2022 9 pages.

(Continued)

*Primary Examiner* — David Colon-Morales
(74) *Attorney, Agent, or Firm* — Fish & Richardson P.C.

(57) ABSTRACT

Some fluid coupling devices described herein are configured as non-spill fluid couplings. In addition, some embodiments described in this document relate to fluid coupling devices that are constructed modularly, and to modules that can be universally incorporated into the construction of multiple different types of fluid couplings. Further, fluid handling component coupling members are described.

19 Claims, 11 Drawing Sheets

(56) References Cited

U.S. PATENT DOCUMENTS

| | | |
|---|---|---|
| 7,547,047 B2 | 6/2009 | Decler et al. |
| 10,190,713 B2* | 1/2019 | Tiberghien .............. F16L 37/32 |
| 10,781,957 B2* | 9/2020 | Tiberghien .............. F16L 37/30 |
| 2002/0148514 A1 | 10/2002 | Taneya et al. |
| 2014/0261819 A1* | 9/2014 | Vranish ................ F16L 27/073 |
| | | 137/798 |
| 2017/0009920 A1 | 1/2017 | Canatella |
| 2018/0209573 A1 | 7/2018 | Tiberghien et al. |
| 2021/0148499 A1* | 5/2021 | Nick ....................... F16L 37/23 |

OTHER PUBLICATIONS

Invitation to Pay Additional Fees in International Application No. PCT/US2020/067700, dated Feb. 17, 2021, 2 pages.

PCT International Search Report and Written Opinion in International Appln. PCT/US2020/067700, dated May 7, 2021, 12 pages.

* cited by examiner

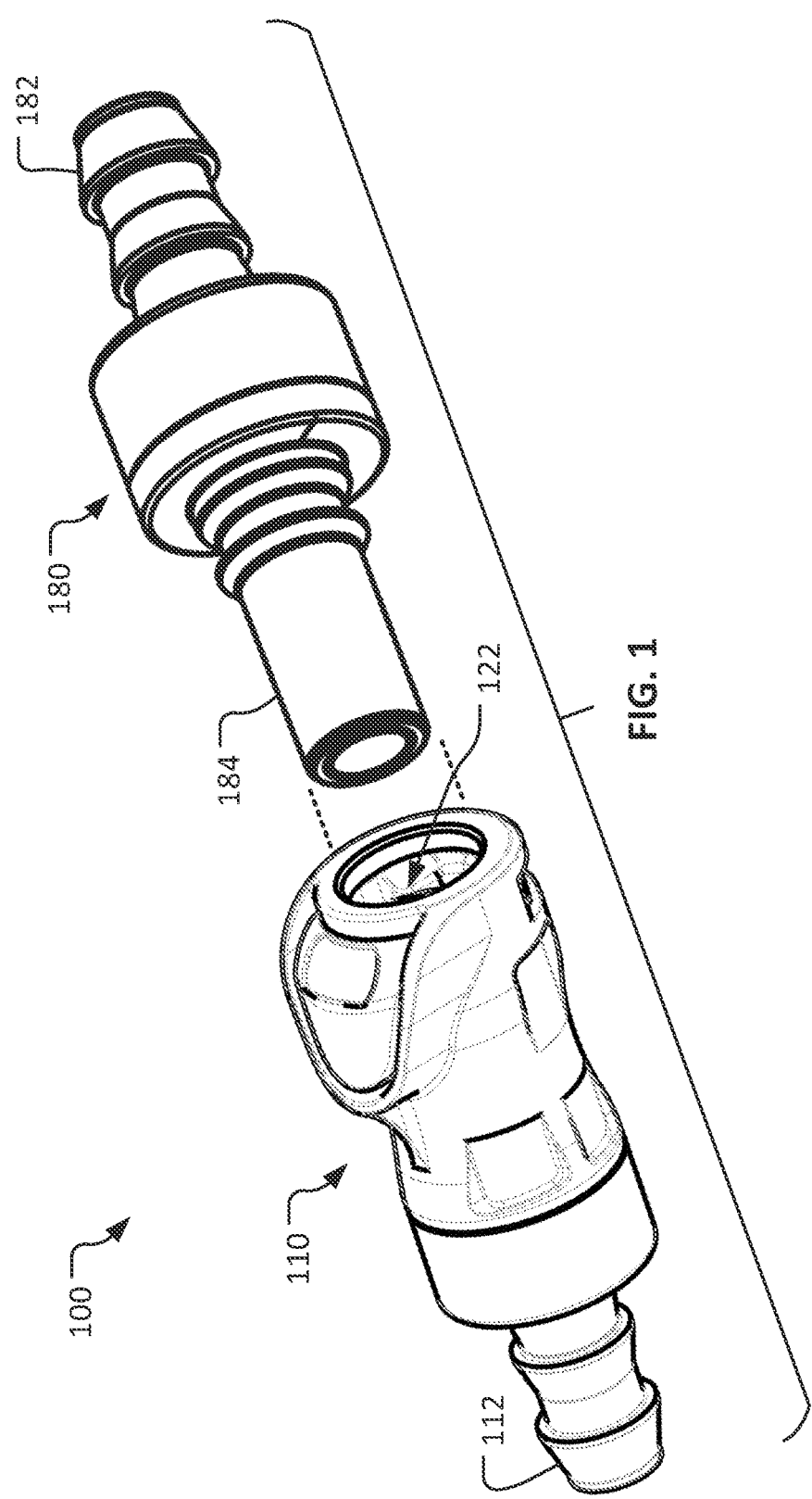

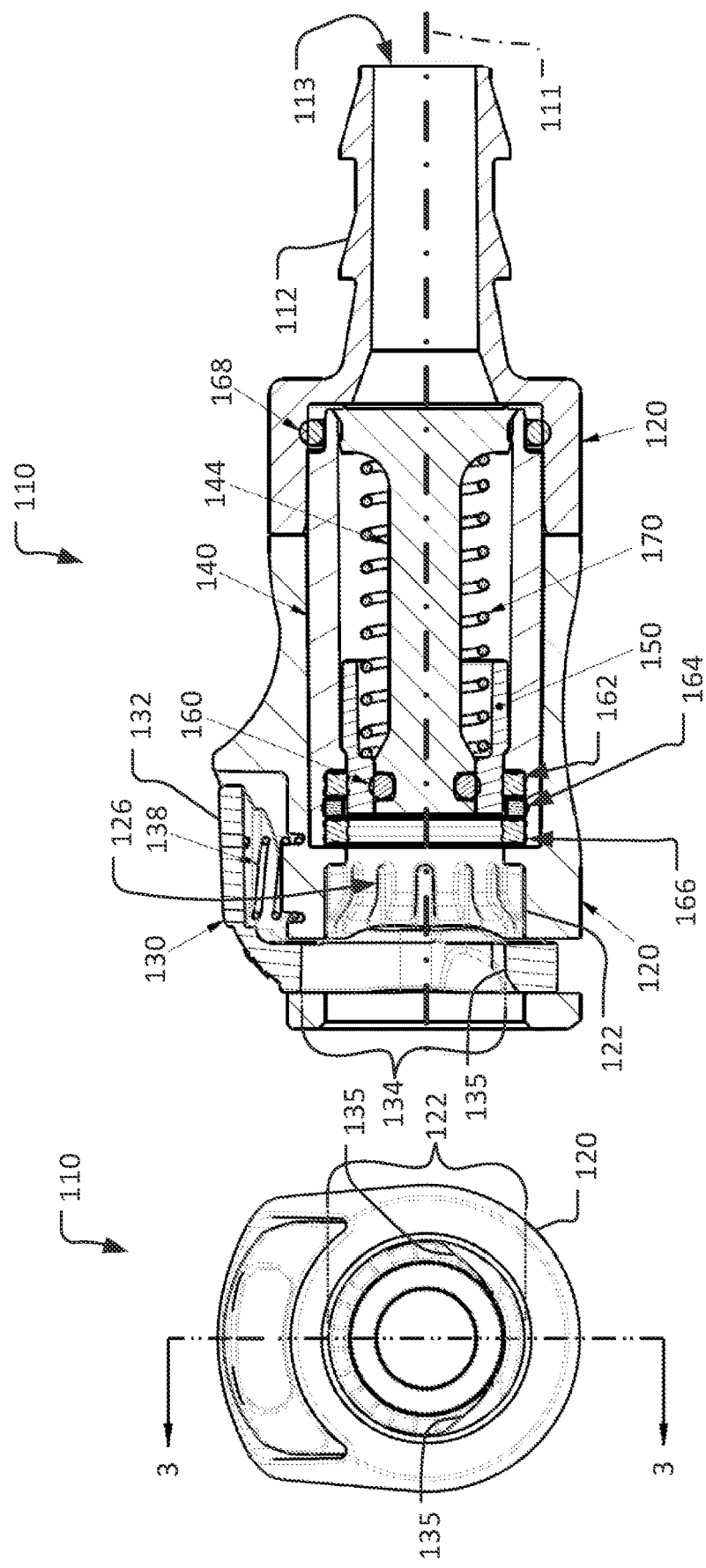

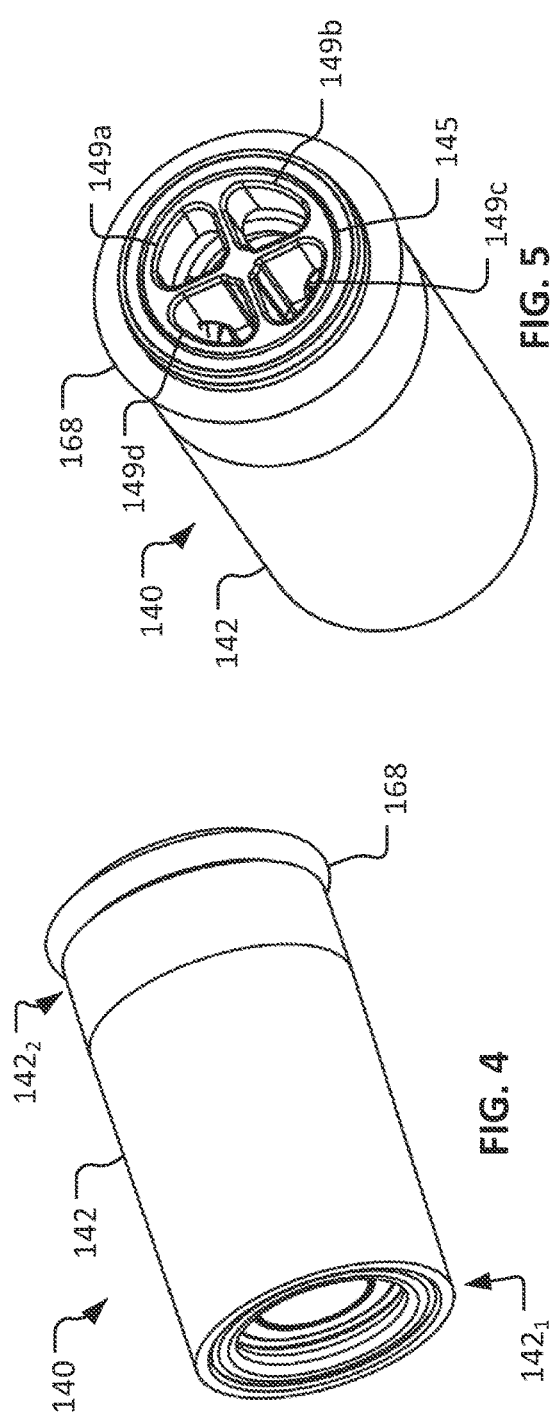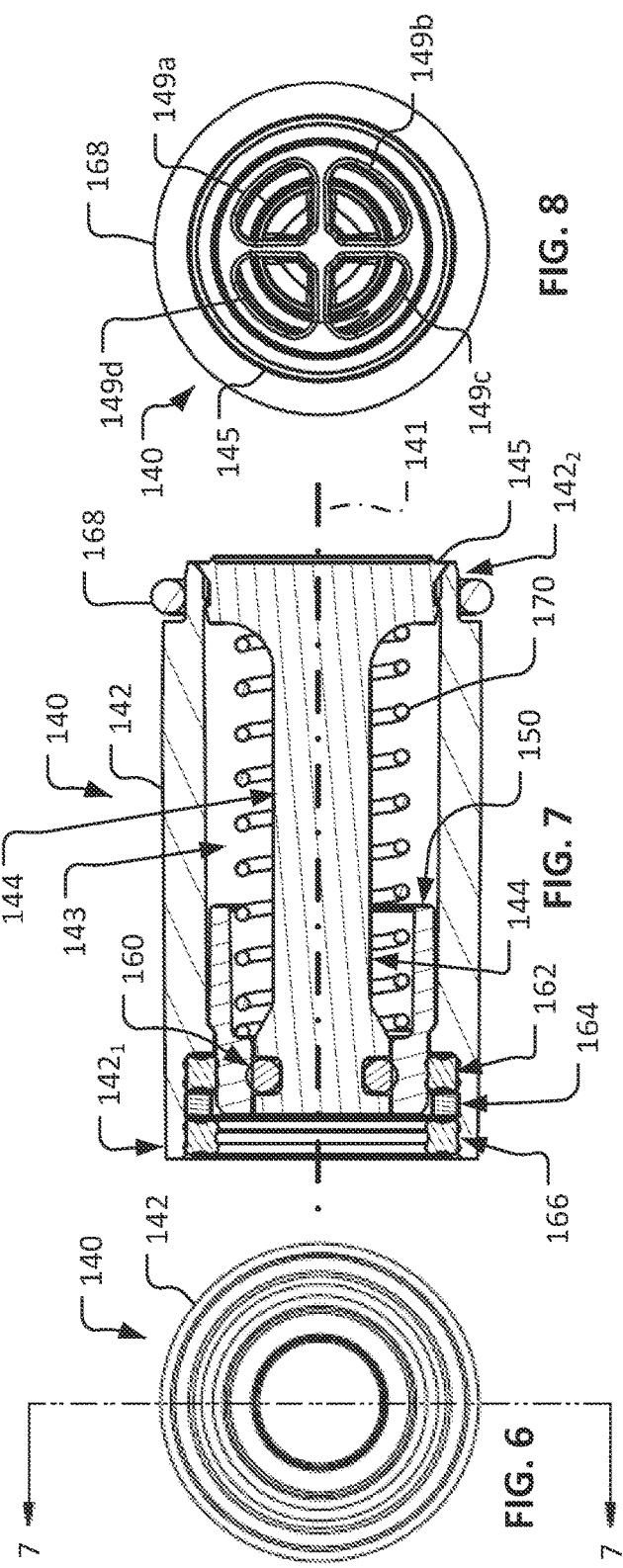

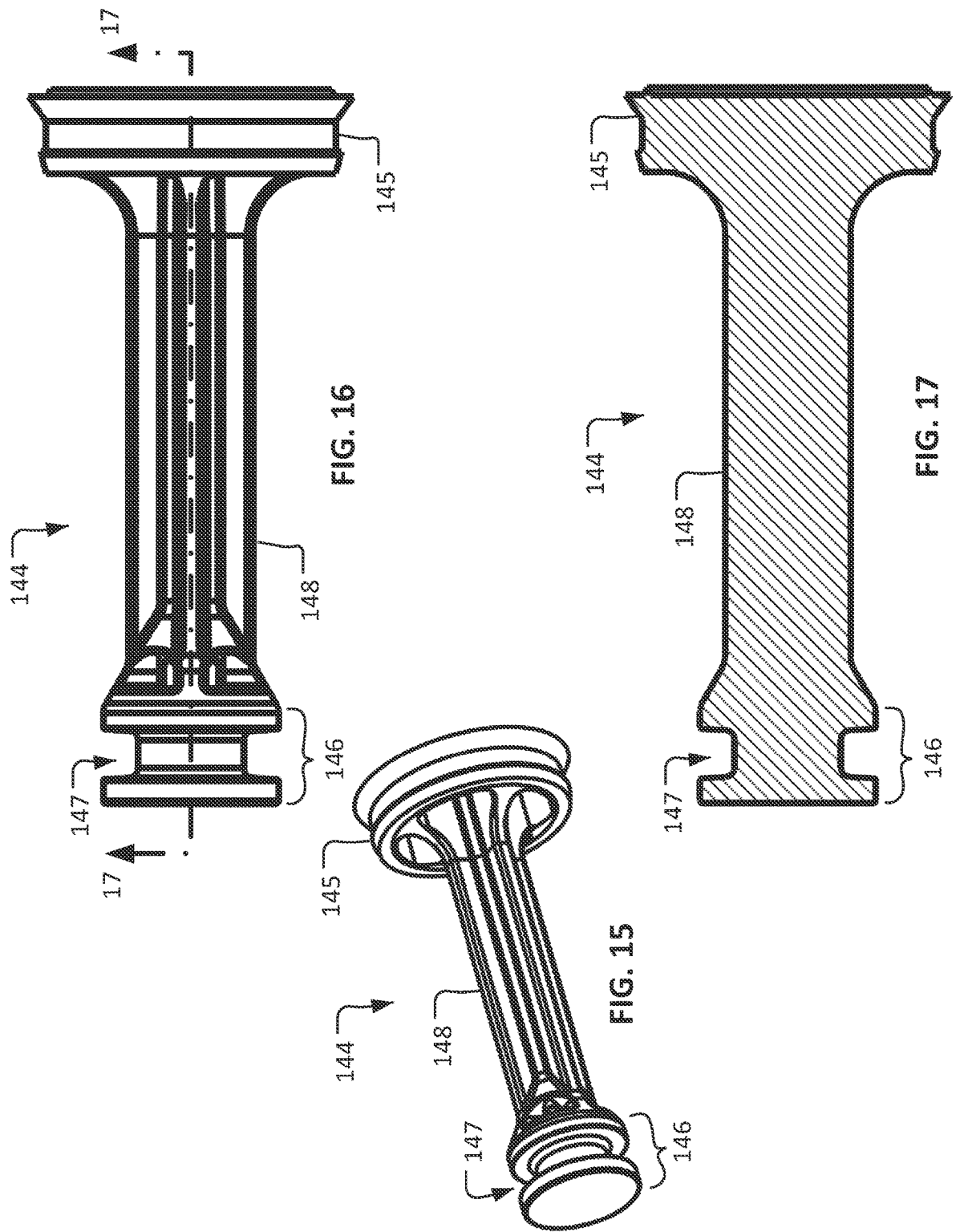

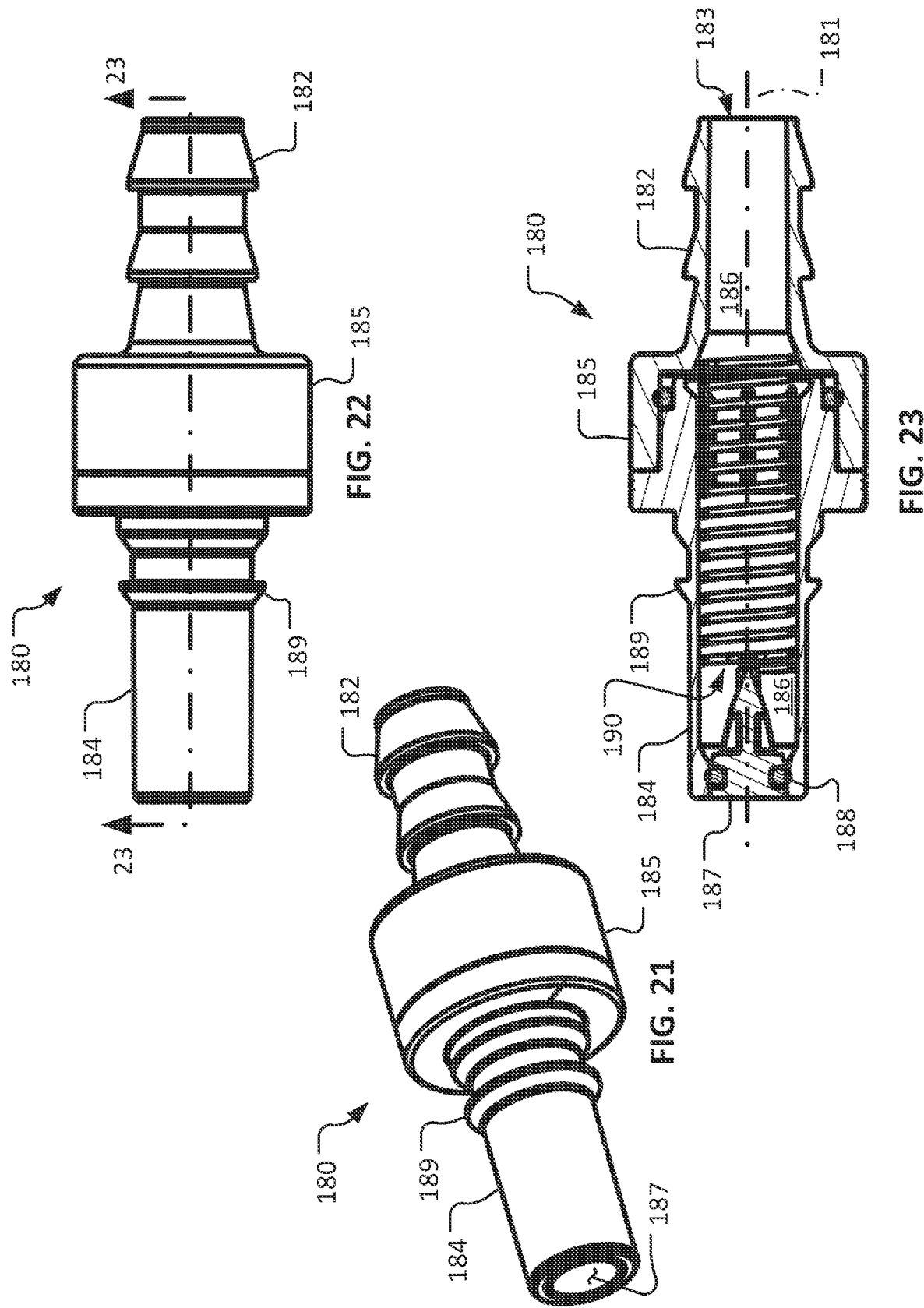

FLUID COUPLINGS

CROSS-REFERENCE TO RELATED APPLICATIONS

This application claims the benefit of U.S. Provisional Application Ser. No. 62/955,783, filed Dec. 31, 2019. The disclosure of the prior application is considered part of (and is incorporated by reference in) the disclosure of this application.

BACKGROUND

1. Technical Field

This document relates to fluid coupling devices for fluid systems and methods of their use. For example, some embodiments described in this document relate to fluid coupling devices that are constructed modularly, and to modules that can be universally incorporated into the construction of multiple different types of fluid couplings.

2. Background Information

Fluid systems commonly include components such as tubing, pumps, reservoirs, fittings, couplings, heat exchangers, sensors, filters, valves, seals, and the like. Such components can be connected together in a network using selectively coupleable fluid coupling devices to define one or more fluid flow paths. Some fluid systems are closed systems, meaning that the fluid recirculates within the network of components. Other fluid systems are open systems, meaning that the fluid passes through the network of components just a single time prior to exiting the network.

Fluid coupling assemblies typically include a female coupling device and a male coupling device that are releasably connected to each other create a fluid flow path therethrough. Such coupling assemblies can be used in various applications, including biomedical applications, beverage dispensing, instrument connections, photochemical handling, liquid cooling, ink handling, and others.

In the context of some fluid systems, such as a fluid system for liquid cooling of electronics, it may be desirable to use non-spill couplings that have minimal or zero fluid spillage during connection and disconnection of the male and female couplings. Such non-spill couplings will serve to limit the exposure of the electronics to the fluid that could damage the electronics, for example.

SUMMARY

This document describes fluid coupling devices for fluid systems and methods of their use. For example, some embodiments described in this document relate to fluid coupling devices that are constructed modularly, and to modules that can be universally incorporated into the construction of multiple different types of fluid couplings. In the context of this disclosure, the term "fluid" includes both gases and liquids. The fluid coupling devices described herein may also be referred to herein as male and female couplings, "coupling halves," and/or "connectors." Male couplings may also be referred to herein as "inserts," and female couplings may also be referred to as "bodies."

In some embodiments described herein, the fluid coupling devices described herein have a modular construction. That is, one or both of the coupling halves can include a core module that can be used in various types of fluid coupling outer bodies. In some embodiments, the core module includes a valve and one or more fluid seals.

In particular embodiments, the fluid coupling devices described herein are specifically designed with one or more mechanical components to configure the devices as "non-spill" coupling devices. The devices described herein are referred to as non-spill coupling devices because as the male and female portions of the coupling devices are being connected to each other and/or disconnected from each other, the designs of the fluid coupling devices will reduce the likelihood of fluid discharge out of the fluid system (for example, by blocking as such discharge paths) and by preventing spillage related to fluid inclusion within the fluid coupling devices.

In one aspect, this disclosure is related to a fluid coupling device that includes a fluid coupling housing defining a first opening leading to a coupling internal space defined within the fluid coupling housing. The fluid coupling device also includes a termination portion extending from the fluid coupling housing on an end of the fluid coupling housing that is opposite of the first opening. The termination portion defines a second opening leading to the coupling internal space. The fluid coupling device also includes a fluid coupling module disposed within the coupling internal space. The fluid coupling module includes a module housing defining a module internal space. The fluid coupling module also includes a stem affixed to the module housing and extending within the module internal space along a longitudinal axis of the fluid coupling module. The fluid coupling module includes a valve sleeve disposed between the stem and the module housing. The valve sleeve is movable along the stem within the module internal space between: (i) a closed position in which the valve sleeve seals the first opening off from the second opening and (ii) an open position in which the first opening is fluidly connected to the second opening via the module internal space.

Such a fluid coupling device may optionally include one or more of the following features. The fluid coupling may also include an elastomeric seal disposed between the module housing and the fluid coupling housing. The fluid coupling device may also include: (i) a first elastomeric seal disposed between the stem and the valve sleeve while the valve sleeve is in the closed position; (ii) a second elastomeric seal disposed between the valve sleeve and the module housing while the valve sleeve is in the closed position; and (iii) a third elastomeric seal disposed within the module internal space and positioned between the second elastomeric seal and the first opening. In some embodiments, a majority of an inner diameter surface of the third elastomeric seal is spaced apart from the valve sleeve while the valve sleeve is in the closed position. The fluid coupling device may also include an annular spacer disposed between the second and third elastomeric seals. The stem may include a base that is affixed to the module housing. The base may define openings that fluidly connect the second opening to the module internal space. In some embodiments, the openings comprise four openings that are each shaped as a quarter circle. The stem may include a base that is affixed to the module housing, and the fluid coupling may also include a spring disposed between the base and the valve sleeve that biases the valve sleeve toward the closed position. The fluid coupling device may also include a latch mechanism adjacent to the first opening. The latch mechanism may be transversely movable relative to the fluid coupling housing between: (i) a latched position in which a center of an opening defined by the latch mechanism is transversely offset in relation to a center of the first opening and (ii) an unlatched position in which the opening defined by the latch mechanism is concentric with the first opening. The fluid coupling device may also include a spring between the latch mechanism and the fluid coupling housing that biases the latch mechanism toward the latched position.

In another aspect, this disclosure is related to a fluid coupling module. The fluid coupling module includes a module housing defining an internal space and a longitudinal axis. The module housing includes: (i) a first end defining a first end opening leading to the internal space and (ii) a second end defining a second end opening leading to the internal space. The fluid coupling module also includes a stem having a base that is affixed to the second end of the module housing. The stem extends from the base along the longitudinal axis toward the first end. The fluid coupling module also includes a valve sleeve disposed between the stem and the module housing. The valve sleeve is movable along the stem within the internal space between: (i) a closed position in which the valve sleeve seals the first end opening off from the second end opening and (ii) an open position in which the first end opening is fluidly connected to the end second opening.

Such a fluid coupling module may optionally include one or more of the following features. The base may define openings that fluidly connect the second end opening to the internal space. In some embodiments, the openings comprise four openings that are each shaped as a quarter circle. The stem may also include a head on an end of the stem opposite of the base. The head may define an annular seal groove configured to receive an elastomeric seal. The fluid coupling module may also include: (i) a first elastomeric seal disposed within the annular seal groove and in contact with an inner diameter of the valve sleeve while the valve sleeve is in the closed position; (ii) a second elastomeric seal disposed between an outer diameter of the valve sleeve and the module housing while the valve sleeve is in the closed position; and (iii) a third elastomeric seal disposed within the module internal space and positioned between the second elastomeric seal and the first end opening. The fluid coupling module may also include an annular spacer disposed between the second and third elastomeric seals. The annular spacer may be in contact with each of the second and third elastomeric seals. The fluid coupling module may also include a spring disposed between the base and the valve sleeve that biases the valve sleeve toward the closed position.

In another aspect, this disclosure is directed to a fluid coupling assembly. The fluid coupling assembly includes a male coupling and a female coupling that are releasably coupleable to each other. The male coupling includes a male housing defining an internal space and a longitudinal axis. The male coupling also includes a male coupling valve member within the internal space and slidable relative to the male housing along the longitudinal axis of the male housing between: (i) an open position in which a first end of the male housing is fluidly connected to a second end of the male housing via the internal space of the male housing and (ii) a closed position in which the male coupling valve member fluidly blocks the first end of the male housing from being fluidly connected to the second end of the male housing. The female coupling includes a female housing defining a first opening leading to an internal space defined within the female housing. The first opening is configured to receive an end portion of the male housing. The female coupling also includes a termination portion extending from the female housing on an end of the female housing that is opposite of the first opening. The termination portion defines a second opening leading to the internal space of the female housing. The female coupling also includes a fluid coupling module disposed within the internal space of the female housing. The fluid coupling module includes a module housing defining a module internal space. The fluid coupling module also includes a stem affixed to the module housing and extending within the module internal space along a longitudinal axis of the fluid coupling module. The fluid coupling module also includes a valve sleeve disposed between the stem and the module housing. The valve sleeve is movable along the stem within the module internal space between: (i) a closed position in which the valve sleeve seals the first opening off from the second opening and (ii) an open position in which the first opening is fluidly connected to the second opening via the module internal space.

In some embodiments, the male and female couplings are configured such that the act of operatively coupling the male coupling with the female coupling moves: (i) the male coupling valve member from its closed position to its open position and (ii) the valve sleeve from its closed position to its open position, resulting in creating an open fluid flow path through the fluid coupling assembly via the internal space of the male housing and the module internal space.

In another aspect, this disclosure is related to a fluid coupling device that includes a fluid coupling housing defining a first opening leading to a coupling internal space defined within the fluid coupling housing and a second opening leading to the coupling internal space. The fluid coupling device also includes a fluid coupling module disposed within the coupling internal space. The fluid coupling module includes a module housing defining a module internal space. The fluid coupling module also includes a valve assembly disposed within the module internal space. The valve assembly is configured to be in: (i) a closed position in which the first opening is sealed off from the second opening or (ii) an open position in which the first opening is fluidly connected to the second opening via the module internal space.

Particular embodiments of the subject matter described in this document can be implemented to realize one or more of the following advantages. First, some embodiments of the fluid coupling devices provide an improved non-spill connection and disconnection capability that may advantageously reduce or eliminate fluid spillage in some cases. As such, these embodiments of the fluid coupling devices described herein may be well-suited, for example, for use in fluid systems that provide liquid cooling to electronics such as computers and the like. Another benefit from the non-spill design of the fluid couplings described herein is the minimization of the inclusion of air into the fluid system as the couplings are connected to each other.

Second, in some embodiments the fluid couplings are advantageously constructed modularly. Such a modular construction may provide advantages such as manufacturing flexibility and user flexibility. For example, a single module can be designed for use in multiple different form factor types of fluid couplings. Accordingly, modular constructions can facilitate associated manufacturing efficiency advantages and inventory carrying cost reductions. Users of modular fluid couplings may also benefit from reduced costs due to the need to carry fewer and/or less costly spare parts.

Third, some embodiments of the fluid coupling devices provided herein are advantageously designed with a robust latching system. That is, when the two halves of the coupling are operably connected with each other to provide a fluid flow path therethrough, they are also mechanically locked together. In some embodiments, to release the lock, a thumb latch must be depressed first. This latching system may reduce the likelihood of unintentional disconnections.

Fourth, in some embodiments, the fluid coupling devices may advantageously provide a user with audible and/or tactile feedback in reference to the motions performed for physically disconnecting the two portions of the fluid coupling devices from each other. Such audible and/or tactile feedback can provide the user with an efficient and conclusive indication or confirmation of the proper function and desired configuration of the fluid coupling device.

Fifth, in some embodiments, the fluid coupling devices may advantageously provide an indication of the temperature of the fluid inside of the coupling by comprising a color-changing material (e.g., a thermochromic polymer) which is responsive to temperature.

Unless otherwise defined, all technical and scientific terms used herein have the same meaning as commonly understood by one of ordinary skill in the art to which this disclosure pertains. In addition, the materials, methods, and examples of the embodiments described herein are illustrative only and not intended to be limiting.

The details of one or more embodiments of the invention are set forth in the accompanying drawings and the description herein. Other features, objects, and advantages of the invention will be apparent from the description and drawings, and from the claims.

DESCRIPTION OF THE DRAWINGS

FIG. 1 is a perspective view of a fluid coupling assembly including an example male fluid coupling device and an example female coupling device arranged in a separated configuration, in accordance with some embodiments provided herein.

FIG. 2 is an end view of a front face of the female fluid coupling device of FIG. 1.

FIG. 3 is a longitudinal cross-sectional view of the female fluid coupling device of FIG. 1 taken along the break line 3-3 of FIG. 2.

FIG. 4 is a perspective view of an example fluid coupling module that is designed for containment within the female fluid coupling device of FIG. 1.

FIG. 5 is another perspective view of the fluid coupling module of FIG. 4.

FIG. 6 is an end view of the fluid coupling module of FIG. 4.

FIG. 7 is a longitudinal cross-sectional view of the fluid coupling module of FIG. 4 taken along the break line 7-7 in FIG. 6.

FIG. 8 is another end view of the fluid coupling module of FIG. 4.

FIGS. 15-17 show a perspective view, side view, and longitudinal cross-sectional view of a stem component of the female fluid coupling device of FIG. 1.

FIGS. 21-23 show a perspective view, side view, and longitudinal cross-sectional view of the male fluid coupling device of FIG. 1.

Like reference numbers represent corresponding parts throughout.

DETAILED DESCRIPTION OF ILLUSTRATIVE EMBODIMENTS

Figure 9:
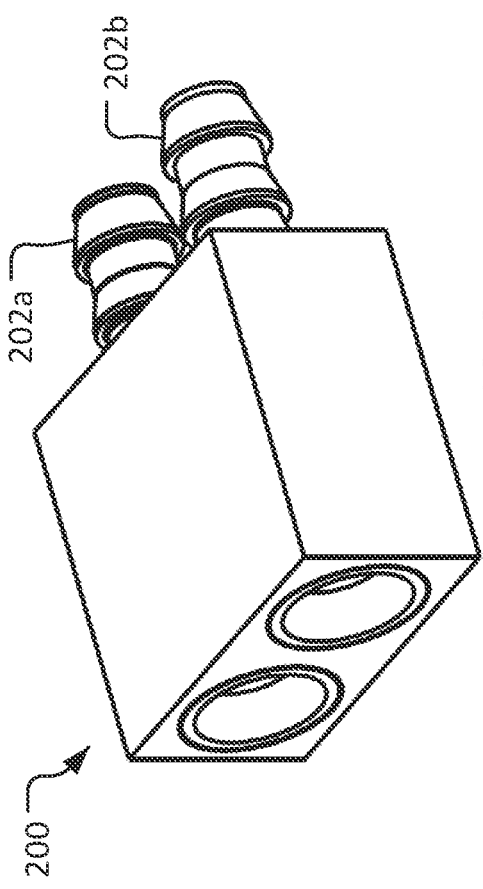
FIG. 9 is a perspective view of another exemplary type of fluid coupling device that can incorporate the fluid coupling module of FIG. 4.

Referring to FIG. 1, some example embodiments of a fluid coupling assembly 100 include a female coupling 110 and a male coupling 180 that are releasably coupleable to each other. Here, the female coupling 110 and the male coupling 180 are depicted in their uncoupled or unconnected arrangement. While the female coupling 110 and the male coupling 180 are uncoupled (as depicted), no open fluid flow path through either of the female coupling 110 or the male coupling 180 exists. Instead, the valves within each of the female coupling 110 and the male coupling 180 are closed such that no fluid can flow through either of the female coupling 110 or the male coupling 180, as described further below.

In contrast to FIG. 1, FIGS. 24-26 (described further below) depict the female coupling 110 and the male coupling 180 in their fully coupled, operative arrangement. While the female coupling 110 and the male coupling 180 are in their fully coupled arrangement, a fluid flow path 101 (FIG. 26) is opened such that fluid can flow through the fluid coupling assembly 100 between a termination portion 112 of the female coupling 110 and a termination portion 182 of the male coupling 180. That is, while the female coupling 110 and the male coupling 180 are in their coupled arrangement, a fluid flow path 101 is opened such that fluid can flow through each of the female coupling 110 and the male coupling 180. In other words, the termination portion 112 of the female coupling 110 and the termination portion 182 of the male coupling 180 are fluidly connected while the female coupling 110 and the male coupling 180 are in their coupled arrangement.

While the termination portion 112 of the female coupling 110 and the termination portion 182 of the male coupling 180 are depicted as barbed connections, it should be understood that the coupling halves 110 and 180 can have any type of connections such as, but not limited to, threaded connections, elbows, tees, sanitary fittings, compression fittings, and the like, and combinations thereof.

The materials from which one or more of the components of the fluid coupling assembly 100 are made of include thermoplastics and/or thermosets. In particular embodiments, the materials from which the components of the fluid coupling assembly 100 are made of are thermoplastics, such as, but not limited to, acetal, polycarbonate, polysulfone, polyether ether ketone, polysulphide, polyester, polyvinylidene fluoride (PVDF), polyethylene, polyphenylsulfone (PPSU; e.g., Rader), polyetherimide (PEI; e.g., Ultem®), polypropylene, polyphenylene, polyaryletherketone, and the like, and combinations thereof. In some embodiments, the materials from which one or more of the components of the fluid coupling assembly 100 are made of include metals such as, but not limited to stainless steel, brass, aluminum, plated steel, and the like. In particular embodiments, one or both of the coupling halves 110 and 180 is/are metallic-free. In some embodiments, one or both of the coupling halves 110 and/or 180 includes one or more metallic spring members (e.g., spring steel, stainless steel, and the like). In certain embodiments, the fluid coupling assembly 100 includes one or more gaskets or seals that are made of materials such as, but not limited to, silicone, fluoroelastomers (FKM), ethylene propylene diene monomer (EPDM), thermoplastic elastomers (TPE), buna, buna-N, thermoplastic vulcanizates (TPV), and the like. In some embodiments, the couplings or portions thereof can be constructed from a color-changing material (e.g., a thermochromic polymer) that is responsive to temperature. Accordingly, the color of such a coupling can provide an indication of the temperature of the fluid inside of the coupling.

It should be understood that the components of the fluid coupling assembly 100 (e.g., the female coupling 110 and the male coupling 180) are scalable to virtually any desired size. Accordingly, the fluid coupling assembly 100 can be scaled to connect a wide range of different tubing sizes from very small tubing (e.g., 3 mm in diameter or smaller) to very large tubing (e.g., 50 mm in diameter or larger).

FIGS. 2 and 3 show the female coupling 110 with additional detail. The female coupling 110, broadly described, includes a female housing 120, the termination portion 112 extending from the female housing 120, and a fluid coupling module 140 disposed within an internal space defined by the female housing 120. The female housing 120 defines a first opening 122 that is configured to receive an end portion 184 of the male coupling 180 (also refer to FIG. 1). The termination portion 112 defines a second opening 113.

The female coupling 110 defines a longitudinal axis 111. In the depicted embodiment, the termination portion 112, the fluid coupling module 140, and the first opening 122 are centered on the longitudinal axis 111.

Figure 11:
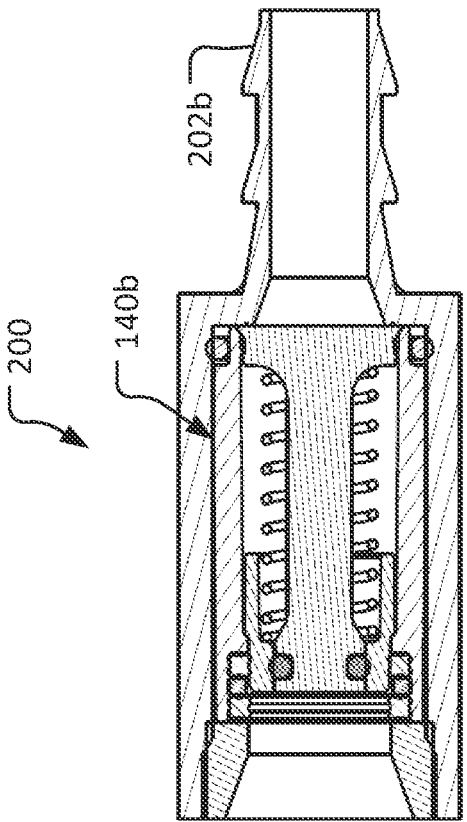
FIG. 11 is a longitudinal cross-sectional view of the fluid coupling device of FIG. 9 taken along the break line 11-11 in FIG. 10.
Figure 10:
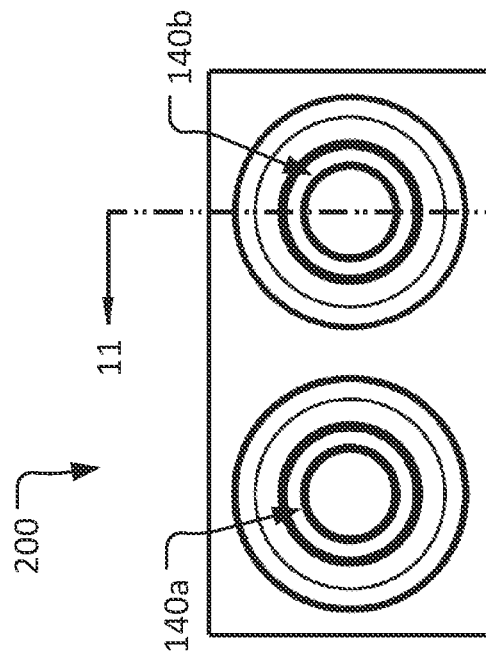
FIG. 10 is an end view of a front face of the fluid coupling device of FIG. 9.

The fluid coupling module 140 (which is depicted in isolation in FIGS. 4-8) is and can be considered as a distinct, self-contained component positioned within the female coupling 110. In other words, while the fluid coupling module 140 is depicted here within the female housing 120 as a part of the female coupling 110, it should be understood that the fluid coupling module 140 can be universally incorporated in a wide variety of different types of fluid couplings. In one additional non-limiting example, as described further below, the fluid coupling module 140 can be incorporated within a dual female fluid coupling device 200 (as depicted in FIGS. 9-11). In some cases, the fluid coupling module 140 can be a stand-alone product.

Figure 25:
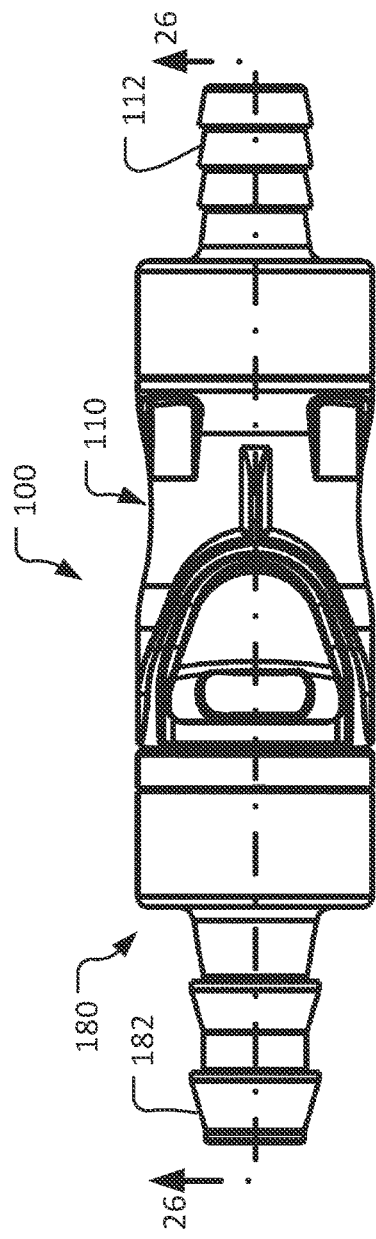
FIGS. 24-26 show a perspective view, top view, and longitudinal cross-sectional view of the coupling assembly of FIG. 1 with the male and female couplings engaged together in an operative configuration that defines an open fluid flow path therethrough.
Figure 24:
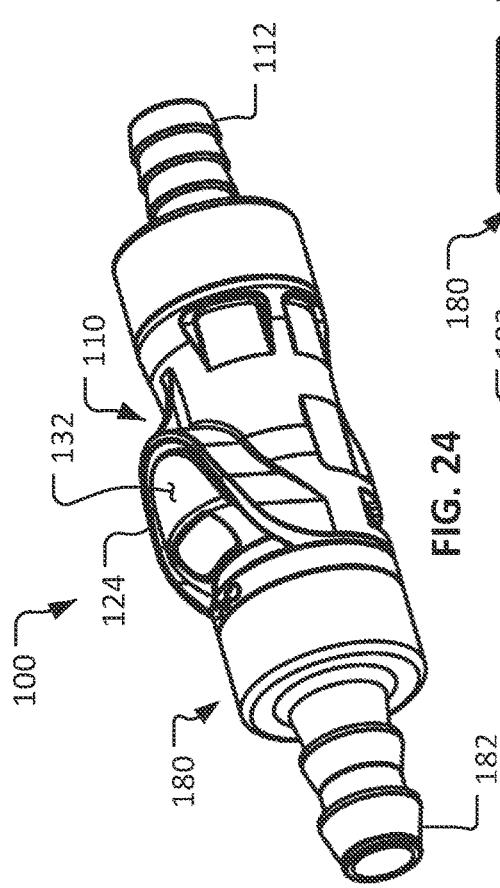
Figure 26:
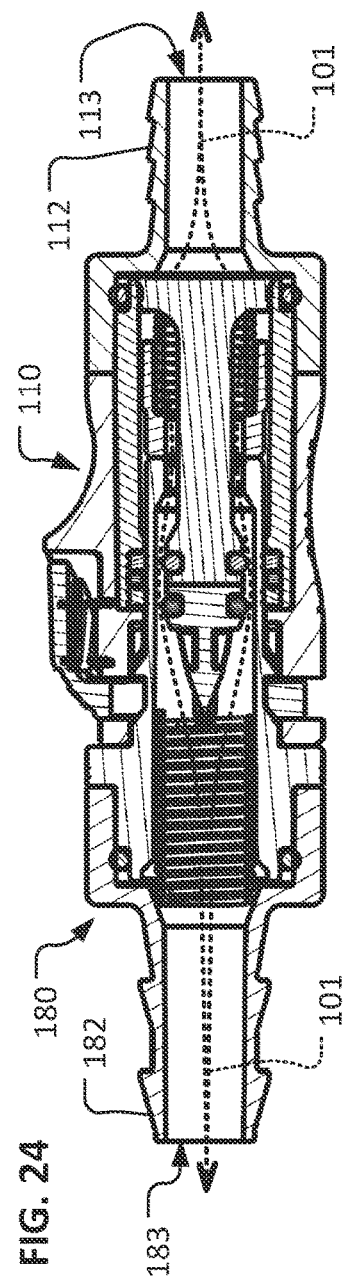

The female coupling 110, as depicted, also includes an optional latch mechanism 130 and a spring 138. The latch mechanism 130 is operable to releasably lock or latch the female coupling 110 and the male coupling 180 together in their fully coupled arrangement (e.g., as shown in FIGS. 24-26). In some embodiments, no latch mechanism is included. Rather, the female coupling 110 and the male coupling 180 are together by other external forces applied to the female coupling 110 and/or the male coupling 180.

The spring 138 is disposed between a thumb plate 132 of the latch mechanism 130 and the female housing 120. The latch mechanism 130 is transversely movable relative to the longitudinal axis 111 between a latched position (as shown) and an unlatched position in which the thumb plate 132 (and latch mechanism 130 overall) is moved transversely toward the longitudinal axis 111 (i.e., downward in the context of FIG. 3). The spring 138 biases the latch mechanism toward the latched position.

The latch mechanism 130 defines an opening 134. While the latch mechanism 130 is in the latched position (as shown), the center of the opening 134 is laterally offset from the longitudinal axis 111 and from the center of the first opening 122. Accordingly, in the latched position, a crescent-shaped portion 135 of the latch mechanism 130 is positioned within the area defined by the first opening 122 (see FIG. 2). While the latch mechanism 130 is in the unlatched position, the center of the opening 134 is coincident with the longitudinal axis 111 and with the center of the first opening 122. Accordingly, the crescent-shaped portion 135 is no longer within the area defined by the first opening 122 while the latch mechanism 130 is in the unlatched position. During connection of the female coupling 110 and the male coupling 180, the force from the insertion of the male coupling 180 will cause the latch mechanism 130 to move to its unlatched position, and then the latch mechanism 130 will revert to its latched position when the male coupling 180 is fully inserted in the female coupling 110.

FIGS. 4-8 show the fluid coupling module 140 in isolation so that its structure can be described in greater detail. The fluid coupling module 140 is a distinctly separate, self-contained component that has utility to be used in a variety of different housings or form factors (e.g., in the female coupling 110, in the dual female fluid coupling device 200 depicted in FIGS. 9-11, and in others). The fluid coupling module 140 can also be considered as a cartridge, a core, and the like.

The fluid coupling module 140 includes a module housing 142. In the depicted embodiment, the module housing 142 is generally cylindrical, but other shapes are also possible. The module housing 142 defines a longitudinal axis 141 and an internal space 143.

The fluid coupling module 140 also includes a stem 144 that is disposed within the internal space 143. The stem 144 includes a base 145 (also shown in FIGS. 15-17) that is a first end portion of the stem 144. The base 145 of the stem 144 is affixed to an inner wall of the module housing 142. The stem 144 extends longitudinally along the longitudinal axis 141 of the fluid coupling module 140. Accordingly, the stem 144 is cantilevered from the attachment of its base 145 to the module housing 142.

Figure 13:
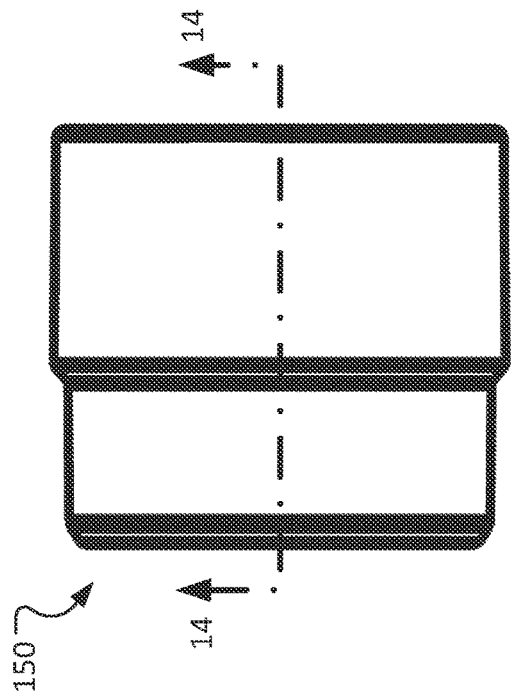
FIGS. 12-14 show a perspective view, side view, and longitudinal cross-sectional view of a valve sleeve component of the female fluid coupling device of FIG. 1.
Figure 14:
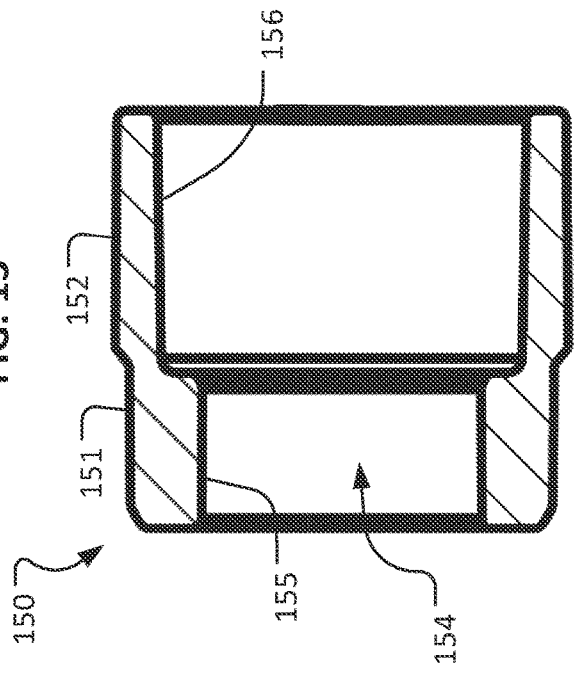
Figure 12:
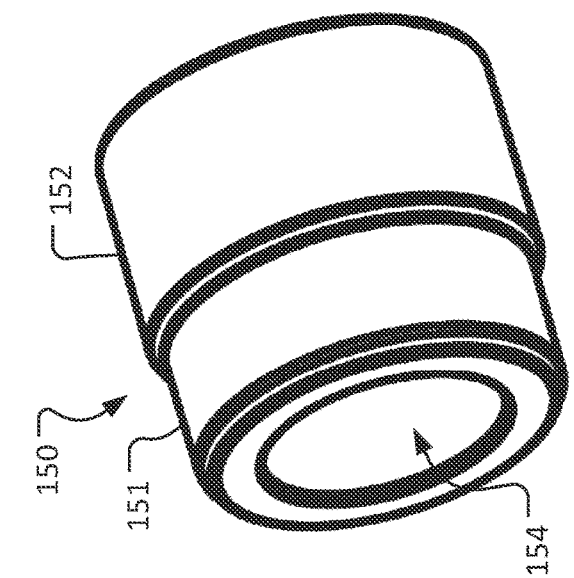

The fluid coupling module 140 also includes a valve sleeve 150 that is disposed within the internal space 143. The valve sleeve 150 (as also shown in FIGS. 12-14) defines an open central area 154 whereby the valve sleeve 150 is disposed around the stem 144. Accordingly, the valve sleeve 150 is positioned between the stem 144 and the module housing 142.

The valve sleeve 150 is movable longitudinally along the stem 144 between a closed position (as shown) and an open position (when the valve sleeve 150 is translated to the right in FIG. 7, and as shown in FIG. 26). While the valve sleeve 150 is in the closed position (as shown), the valve sleeve 150 blocks a potential fluid flow path through the fluid coupling module 140 from being open. In contrast, when the valve sleeve 150 is moved to its open position (e.g., as shown in FIG. 26) then a fluid flow path is open through the fluid coupling module 140 because the valve sleeve 150 is not fully blocking the fluid flow path. Accordingly, the valve sleeve 150 functions with the stem 144 and the module housing 142 as a valve assembly, to operably open or close a fluid flow path through the fluid coupling module 140 via the internal space 143 of the module housing 142.

The fluid coupling module 140 also includes multiple annular elastomeric sealing members (or simply "seals"). The seals can be made of materials such as, but not limited to, silicone, fluoroelastomers (FKM), ethylene propylene diene monomer (EPDM), thermoplastic elastomers (TPE), buna, buna-N, thermoplastic vulcanizates (TPV), thermosets, and the like.

For example, the fluid coupling module 140 includes a first elastomeric seal 160 disposed between the stem 144 and an inner diameter of the valve sleeve 150 while the valve sleeve 150 is in the closed position (as shown). The first elastomeric seal 160 is disposed in an annular seal groove 147 defined by a head 146 of the stem (also see FIGS. 15-17). As the valve sleeve 150 moves toward its open position (see FIG. 26), the valve sleeve 150 moves out of contact with the first elastomeric seal 160.

The fluid coupling module 140 also includes a second elastomeric seal 162 disposed between an outer diameter of the valve sleeve 150 and an inner diameter of the module housing 142 while the valve sleeve 150 is in the closed position (as shown). The second elastomeric seal 162 remains in a fixed position relative to the module housing 142 such that as the valve sleeve 150 moves toward its open position (see FIG. 26), the valve sleeve 150 moves out of contact with the second elastomeric seal 162.

The fluid coupling module 140 also includes a third elastomeric seal 166 disposed within the module internal space 143. The third elastomeric seal 166 is adjacent the end of the module housing 142 that is opposite of the end of the module housing 142 to which the base 145 of the stem 144 is attached. When the fluid coupling module 140 is incorporated in the female coupling 110 (e.g., see FIG. 3), the third elastomeric seal 166 is positioned between the second elastomeric seal 162 and the first opening 122. The third elastomeric seal 166 is configured to seal against the end portion 184 of the male coupling 180 (also refer to FIG. 1) when the male coupling 180 is coupled with the female coupling 110.

The fluid coupling module 140 also includes a fourth elastomeric seal 168 disposed around an outer end of the module housing 142. The fourth elastomeric seal 168 is positioned to abut against an inner diameter of the female housing 120 when the fluid coupling module 140 is incorporated in the female coupling 110 (e.g., see FIG. 3). The fourth elastomeric seal 168 can also be positioned elsewhere to seal against the female housing 120 (e.g., the fourth elastomeric seal 168 can be a face seal that abuts against the female housing 120).

In some embodiments, an annular spacer 164 is disposed between the second elastomeric seal 162 and the third elastomeric seal 166. For example, the annular spacer 164 can be press-fit into the inner diameter of the portion of the module housing 142 that is configured to receive the second elastomeric seal 162 and the third elastomeric seal 166.

In some embodiments, the inner diameter surface of the third elastomeric seal 166 is spaced apart from the valve sleeve 150 while the valve sleeve 150 is in the closed position, such that the third elastomeric seal 166 and the valve sleeve 150 are never in contact with each other whatsoever. In some embodiments, a majority of an inner diameter surface of the third elastomeric seal 166 is spaced apart from the valve sleeve 150 while the valve sleeve 150 is in the closed position.

The fluid coupling module 140 also includes a spring 170. The spring 170 disposed between the base 145 of the stem 144 and the valve sleeve 150. Accordingly, the spring 170 biases the valve sleeve 150 toward its closed position.

As shown in the example of FIGS. 9-11, the fluid coupling module 140 is configured to be modularly incorporated in various types of fluid couplings having different form factors. In this example, a dual female fluid coupling device 200 includes two of the fluid coupling modules 140 (i.e., a first fluid coupling module 140a and a second fluid coupling module 140b). Accordingly, it should be understood that the design of the fluid coupling module 140 facilitates universal use of the fluid coupling module 140 as a component in conjunction with many different types of fluid couplings.

FIGS. 12-14 show the valve sleeve 150 in isolation so that its structure can be seen in greater detail. The valve sleeve 150 defines the open central area 154 in which the stem 144 is disposed.

The outer diameter of the valve sleeve 150 includes a smaller outer diameter portion 151 and a larger outer diameter portion 152. The smaller outer diameter portion 151 seals against the second elastomeric seal 162 while the valve sleeve 150 is in its closed position (see FIGS. 3 and 7). The larger outer diameter portion 152 runs against an inner diameter of the module housing 142 as the valve sleeve 150 moves between its closed position (see FIGS. 3 and 7) and its open position (see FIG. 26).

The transition between the smaller outer diameter portion 151 and the larger outer diameter portion 152 abuts against an annular shoulder of the module housing 142 that extends radially inward (see FIGS. 3 and 7). The mechanical interference between the transition (between the smaller outer diameter portion 151 and the larger outer diameter portion 152) and the annular shoulder of the module housing 142 defines the closed position of the valve sleeve 150 and blocks the valve sleeve 150 from traveling farther away from the base 145 of the stem 144 in response to force from the spring 170.

The inner diameter of the valve sleeve 150 includes a smaller inner diameter portion 155 and a larger inner diameter portion 156. The smaller inner diameter portion 155 seals against the first elastomeric seal 160 while the valve sleeve 150 is in its closed position (see FIGS. 3 and 7). The larger inner diameter portion 156 defines a pocket for an end portion of the spring 170, and an end coil of the spring 170 abuts against the transition between the smaller inner diameter portion 155 and the larger inner diameter portion 156.

FIGS. 15-17 show the stem 144 in isolation so that its structure can be seen in greater detail. The stem 144 includes the base 145 at an end portion of the stem 144, and the head 146 at an opposite end portion of the stem 144. A fluted shaft 148 of the stem 144 extends between, and interconnects, the base 145 and the head 146.

The base 145 is affixed to the module housing 142 at a second end $142_2$ of the module housing 142 (e.g., FIG. 7). The stem 144 extends along the longitudinal axis 141 of the module housing 142 toward the first end $142_1$ of the module housing 142. The first end $142_1$ of the module housing 142 and the second end $142_2$ of the module housing 142 are both open ends of the module housing 142 that lead to the module internal space 143.

The base 145 defines one or more openings that fluidly connect second end $142_2$ of the module housing 142 to the module internal space 143. In other words, the base 145 does not totally close off the module internal space 143 from the space outside of the module housing 142. In the depicted embodiment of the stem 144, the base 145 defines four openings that are each shaped as a quarter circle. The four openings 149a, 149b, 149c, and 149d are best seen in FIGS. 5 and 8.

Figure 19:
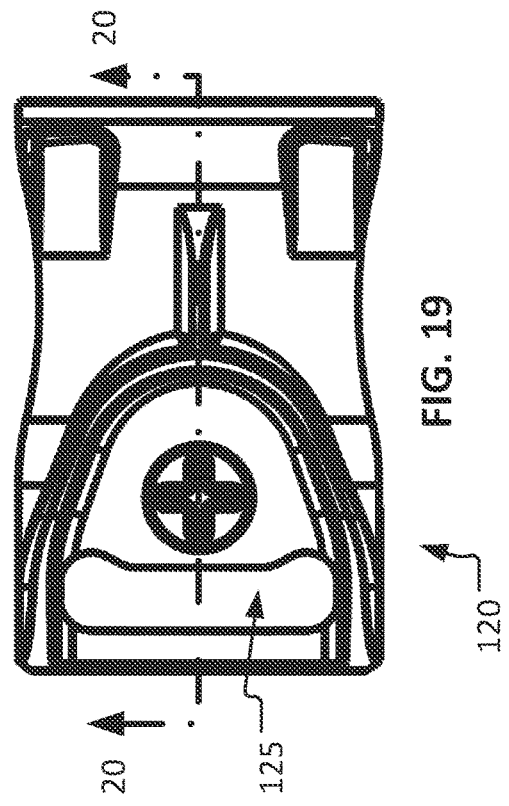
FIGS. 18-20 show a perspective view, top view, and longitudinal cross-sectional view of a housing component of the female fluid coupling device of FIG. 1.
Figure 20:
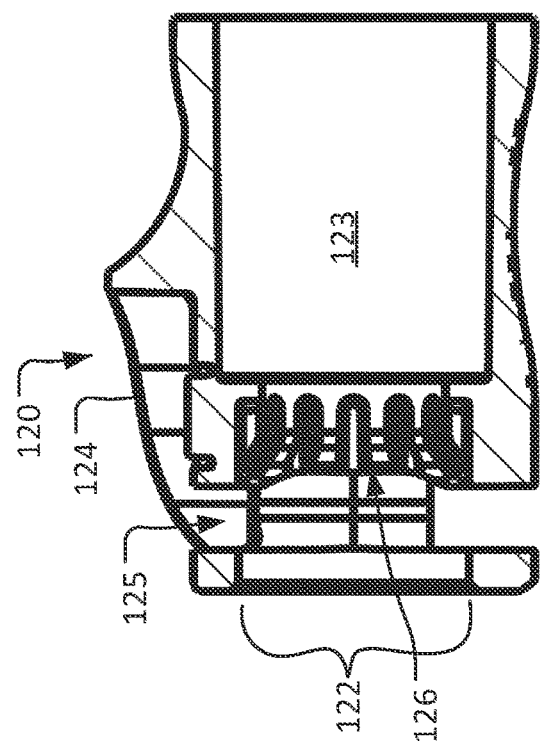
Figure 18:
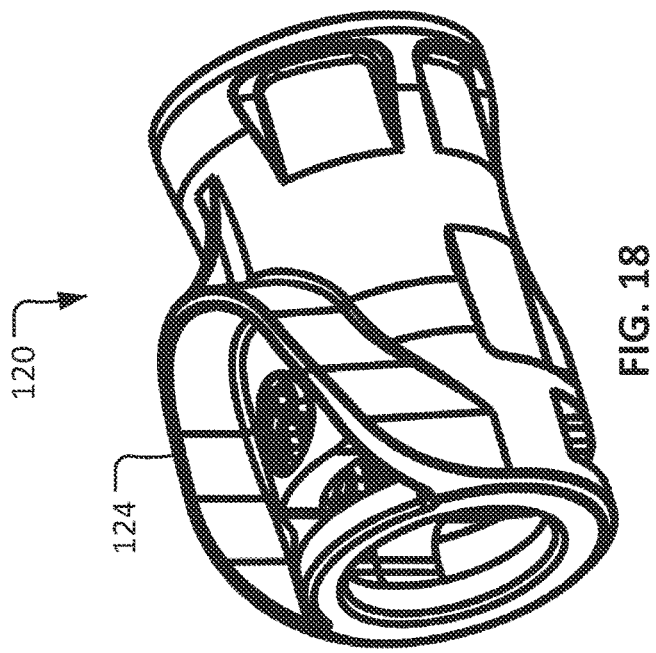

FIGS. 18-20 show the female housing 120 in isolation so that its structure can be seen in greater detail. Here, the female housing 120 is shown without its termination portion 112. The female housing 120 defines the first opening 122 that leads to a coupling internal space 123 defined within the female housing 120. In the embodiment of the female coupling 110, the fluid coupling module 140 is disposed within the coupling internal space 123 (e.g., as shown in FIGS. 3, 7, and 26).

In the depicted embodiment, the female housing 120 defines a transverse slot 125 that movably receives the plate portion of the latch mechanism 130 that defines the opening 134 (e.g., see FIG. 3).

In the depicted embodiment, the female housing 120 includes a shroud 124 that boarders the thumb plate 132 of the latch mechanism 130 (e.g., as shown in FIGS. 3 and 24). In the depicted embodiment, the thumb plate 132 is slightly recessed below the top of the shroud 124 to help prevent inadvertent depressions of the latch mechanism 130 (which could result in an unintentional uncoupling the female coupling 110 and the male coupling 180). The shroud 124 is an optional feature.

The inner diameter wall of an inner portion of the first opening 122 defines a series of longitudinally extending slots 126 (e.g., as seen in FIGS. 3 and 20).

FIGS. 21-23 show the male coupling 180 in isolation so that its structure can be seen in greater detail. The male coupling 180 includes a male housing 185 that defines an internal space 186 and a longitudinal axis 181. The male coupling 180 includes the termination portion 182 that defines an opening 183 leading to the internal space 186. The male coupling 180 also includes the end portion 184 (which is a portion of the male housing 185).

The male coupling 180 also includes a male coupling valve member 187 movably disposed within the internal space 186 of the male housing 185. The male coupling valve member 187 includes a seal 188 that fluidly seals the opening defined by the end portion 184 from the internal space 186. The male coupling valve member 187 within the internal space 186 is slidable relative to the male housing 185 along the longitudinal axis 181 of the male housing 185 between: (i) an open position in which a first open end of the male housing 185 defined by the end portion 184 is fluidly connected to the opening 183 via the internal space 186 of the male housing 185 and (ii) a closed position (as shown in FIG. 23) in which the male coupling valve member 187 (and its seal 188) fluidly blocks the first open end of the male housing 185 defined by the end portion 184 from being fluidly connected to the opening 183.

The male coupling 180 also includes a spring 190, disposed within the internal space 186, that is arranged to bias the male coupling valve member 187 toward its closed position. Coupling the male coupling 180 with the female coupling 110 compresses the spring 190 and moves the male coupling valve member 187 from its closed position to its open position.

FIGS. 24-26 show the fluid coupling assembly 100 in a coupled arrangement. That is, the female coupling 110 and the male coupling 180 are coupled together, and their respective valves are open. Accordingly, an open fluid flow path 101 is established through the entire fluid coupling assembly 100. The open fluid flow path 101 extends between: (i) the opening 113 defined by the termination portion 112 of the female coupling 110 and (ii) the opening 183 defined by the termination portion 182 of the male coupling 180. The open fluid flow path 101 passes through the internal space 143 defined by the fluid coupling module 140 within the female coupling 110 and through the internal space 186 defined by the male housing 185 of the male coupling 180.

The valves of each of the couplings 110 and 180 are moved to their open positions. For example, when the female coupling 110 and the male coupling 180 are coupled together, the front face of the head 146 of the stem 144 of the fluid coupling module 140 abuts against the front face of the male coupling valve member 187 so as to displace the male coupling valve member 187 to its open position. In addition, when the female coupling 110 and the male coupling 180 are coupled together, the leading annular face of the end portion 184 of the male coupling 180 abuts against the annular front face of the valve sleeve 150 of the fluid coupling module 140 so as to displace the valve sleeve 150 to its open position. Accordingly, the physical act of coupling the female coupling 110 and the male coupling 180 together opens their valves and creates the open fluid flow path 101 through the fluid coupling assembly 100.

Conversely, when the female coupling 110 and the male coupling 180 are uncoupled from each other, the springs 170 and 190 force the valve sleeve 150 and the male coupling valve member 187 back to their closed positions so that both of the couplings halves 110 and 180 are sealed to prevent fluid from leaking out from the female coupling 110 and the male coupling 180. Moreover, it can also be seen in FIG. 26 that there are essentially no open regions between the fluid coupling halves 110 and 180 that provide volumetric space for fluid inclusion. Accordingly, there will be zero or essentially zero spillage or leakage when the valve sleeve 150 and the male coupling valve member 187 are back in their closed positions and the fluid coupling halves 110 and 180 are separated from each other. Accordingly, there will be essentially no fluid spillage when the fluid coupling halves 110 and 180 are separated from each other.

Figure 27:
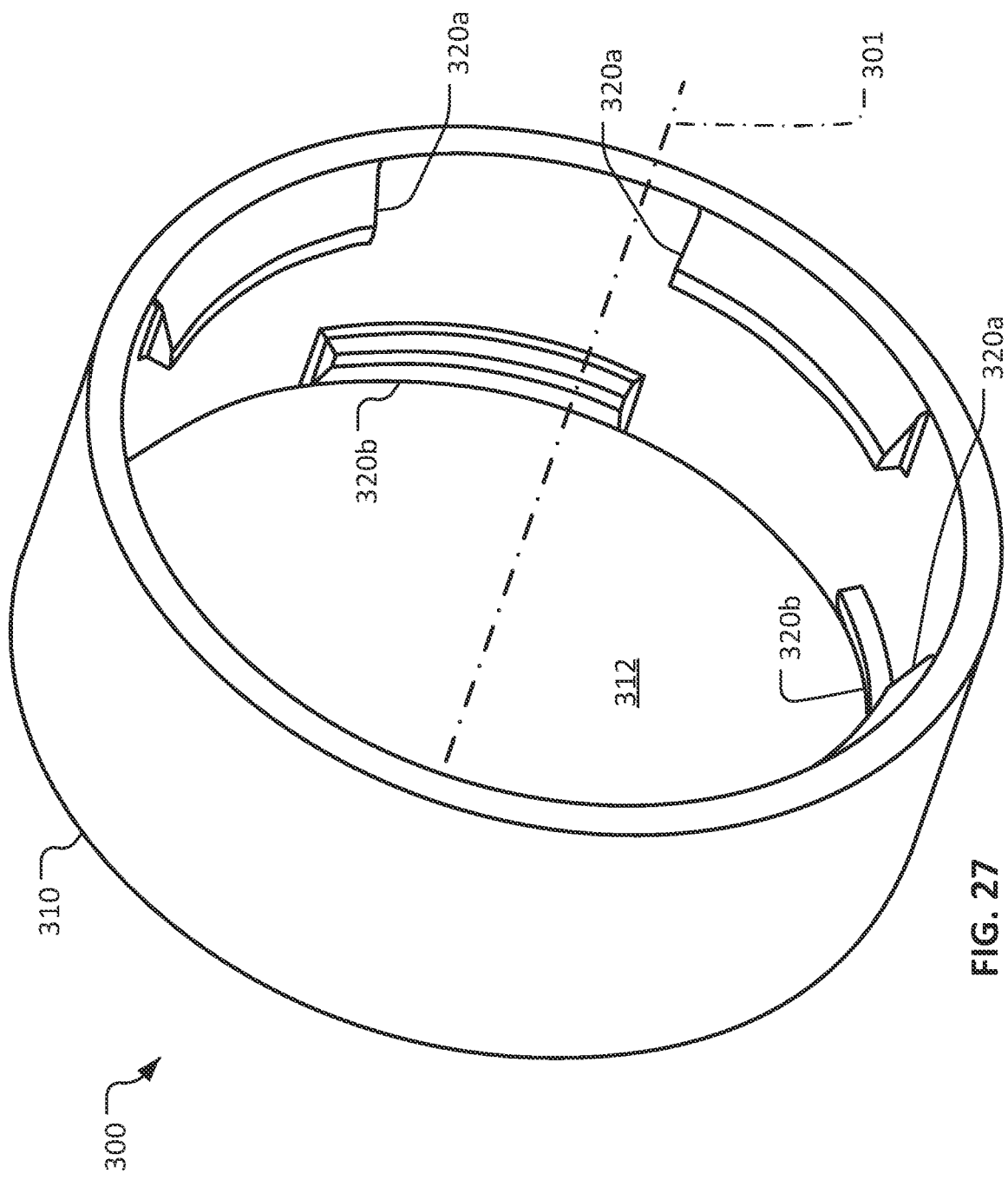
FIG. 27 shows a perspective view of an example fluid handling component coupler in accordance with some embodiments.

Referring to FIG. 27, a fluid handling component coupler 300 (or more simply stated hereinafter, "coupler 300") can be used to join two fluid handling components to each other. In some embodiments, the coupler 300 is a unitary thermoplastic member that is made by injection molding. In particular embodiments, the coupler 300 is a unitary metallic member that is made by machining, die casting, or metal injection molding. In some embodiments, the coupler 300 is assembled from multiple components.

As described further below, the coupler 300 can be used as part of the female and male couplings described herein. More broadly speaking, however, the coupler 300 can be used to join two fluid handling components of any type, design, or function to each other. For example, a fluid handling assembly can include a first fluid handling component, a second fluid handling component, and the coupler 300. The coupler 300 can be used to attach the first and second fluid handling components to each other. In some cases, the coupler 300 can be used to attach a termination component (e.g., a barb termination, threaded termination, sanitary fitting termination, and the like) to a second fluid handling component such as a coupling body, a tube, a housing, and the like, without limitation. The coupler 300 can be used to join two fluid handling components of any type, design, and/or function to each other.

The coupler 300 includes a peripheral member 310 that defines an opening 312 with a central axis 301. In the depicted embodiment, the peripheral member 310 is an open cylinder with a circular cross-sectional shape. In some embodiments, the cross-sectional shape of the peripheral member 310 can be other shapes such as, but not limited to, ovular, rectangular, oblong, elliptical, square, triangular, polygonal, and the like.

Extending or projecting radially inwardly from an inner wall of the peripheral member 310 are a first series of detainment elements 320a and a second series of detainment elements 320b. For example, in the depicted embodiment the first series of detainment elements 320a includes four individual detainment elements 320a that are equally spaced apart from each other around the inner periphery of the peripheral member 310. Similarly, the second series of detainment elements 320b includes four individual detainment elements 320b that are equally spaced apart from each other around the inner periphery of the peripheral member 310.

While the detainment elements can have various configurations, in the depicted embodiment the individual detainment elements of the first and second series of detainment elements 320a and 320b are ramps or ratchet teeth that are arcuate. The leading ends (lower ends) of the ramps or ratchet teeth are adjacent to the outer edges (rims) of the peripheral member 310. By "adjacent," it is meant that the leading ends of the ramps or ratchet teeth can be exactly at the outer edges of the peripheral member 310 or recessed from the outer edges of the peripheral member 310 by a short distance.

The heights of the individual detainment elements (ramps) increase along a direction from the outer edge of the peripheral member 310 to which the detainment elements are adjacent toward the opposite outer edge of the peripheral member 310. Accordingly, the coupler 300 is configured to allow fluid handling components to be snapped into engagement with each end of the coupler 300. In that manner, the coupler 300 can conveniently conjoin two fluid handling components.

It can be seen in FIG. 27 that there are gaps between the individual detainment elements of the first series of detainment elements 320a. Similarly, there are gaps between the individual detainment elements of the second series of detainment elements 320b. The individual detainment elements of the second series of detainment elements 320b are axially aligned (e.g., viewing along the central axis 301) with the gaps between the individual detainment elements of the first series of detainment elements 320a. Similarly, the individual detainment elements of the first series of detainment elements 320a are axially aligned with the gaps between the individual detainment elements of the first series of detainment elements 320a. Accordingly, it can be said that each detainment element of the first series of detainment elements 320a is radially offset from each detainment element of the second series of detainment elements 320b, and that each detainment element of the second series of detainment elements 320b is radially offset from each detainment element of the first series of detainment elements 320a.

In the depicted example coupler 300, each detainment element of the first and second series of the detainment elements 320a-b extends for about 45° along an arc around the central axis 301. In addition, each of the gaps between the first and second series of the detainment elements 320a-b extends for about 45° along an arc around the central axis 301. Other configurations are also possible while keeping to the same basic structure. For example, in some embodiments the detainment elements 320a-b and the gaps extend about 60° along an arc around the central axis 301, or about 90° along an arc around the central axis 301, or about 36° along an arc around the central axis 301, or about 30° along an arc around the central axis 301, or about 20° along an arc around the central axis 301, without limitation.

Figure 28:
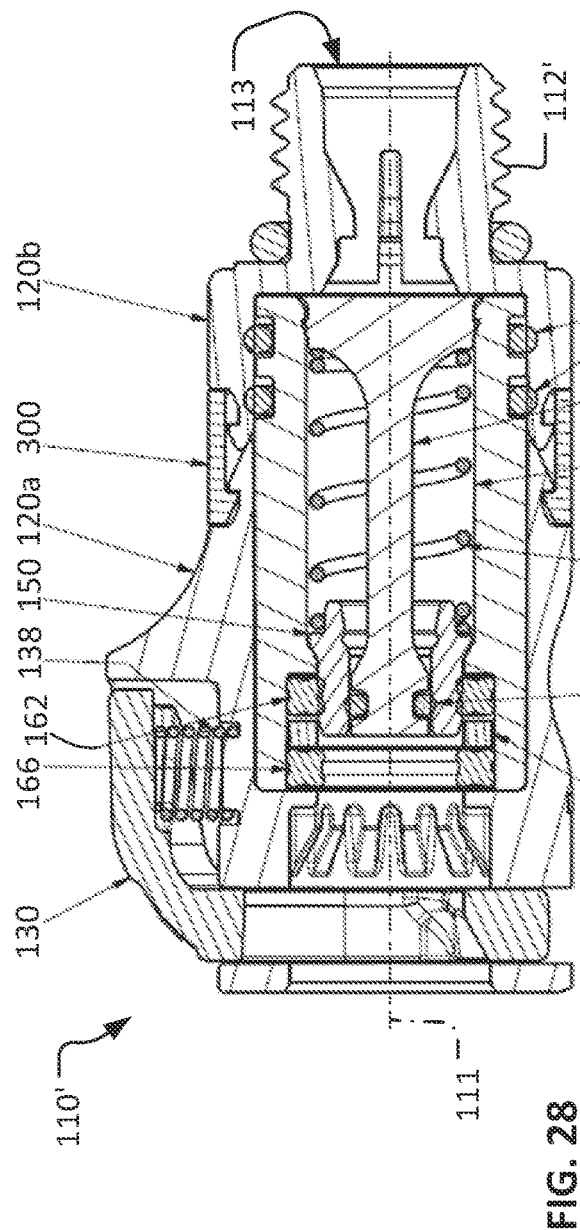
FIG. 28 is a longitudinal cross-sectional view of an example female fluid coupling device that includes the fluid handling component coupler collar of FIG. 27.

FIG. 28 shows one example of how the coupler 300 can be used to conjoin two fluid handling components. In this example, the housing 120 of the female coupling 110 (as described above, e.g., see FIG. 3) is modified to use the coupler 300. Accordingly, the modified female coupling is referred to in FIG. 28 as female coupling 110', and the housing is referred to as: (i) main body housing 120a and (ii) termination housing 120b. In this example, the termination housing 120b includes a threaded termination portion 112' in contrast to the barbed termination portion 112 of the female coupling 110. Accordingly, this example shows how the coupler 300 can be readily used to facilitate the combination of differing types of termination portions in conjunction with the base design of the female coupling 110. This capability can thereby provide manufacturing efficiencies and/or user convenience (e.g., by allowing the user to select a desired style of termination portion).

In the depicted example, the main body housing 120a and the termination housing 120b are conjoined (mechanically attached) by the coupler 300. In order for the mechanical attachment to be secure, each of the main body housing 120a and the termination housing 120b define one or more recesses that receive(s) the detainment elements of the first and second series of detainment elements 320a and 320b. In some embodiments, the one or more recesses defined by the main body housing 120a and the termination housing 120b are each an annular groove (extending continuously, fully circumferentially). The illustration of female coupling 110' shows two detainment elements of the coupler 300 engaged in a recess defined by the main body housing 120a, but no detainment elements of the coupler 300 are shown as engaged in a recess defined by the termination housing 120b. That is the case simply because this cross-sectional view happens to cut through detainment elements that are engaged in the recess(es) defined by the main body housing 120a, but does not cut through the detainment elements that are engaged in the recess(es) defined by the termination housing 120b. While not visible in this illustration, there are in fact detainment elements that are engaged in the recess(es) defined by the termination housing 120b.

In the depicted embodiment, the coupler 300 allows for relative rotation of the main body housing 120a with respect to the termination housing 120b. Alternatively, in some embodiments the coupler 300 (and/or the housings 120a-b) can be configured to prevent or restrict such relative rotation. For example, in some embodiments the coupler 300 can include one or more keying elements that engage with one or more complementary structural elements of the body housing 120a and/or the termination housing 120b to prevent or restrict relative rotation. In another example, one or more of the detainment elements of the coupler 300 can be structurally different than other detainment elements of the same coupler 300, and such different detainment element(s) can be used to mate with one or more complementary structural element(s) (e.g., different type of recess, such as deeper) of the body housing 120a and/or the termination housing 120b to prevent or restrict relative rotation.

Figure 29:
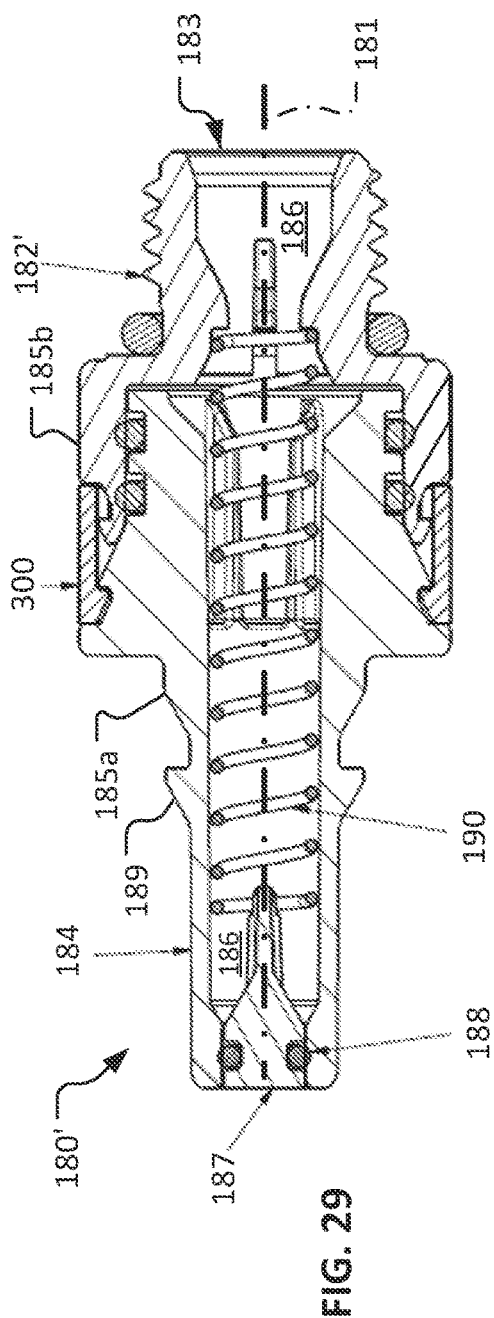
FIG. 29 is a longitudinal cross-sectional view of an example male fluid coupling device that includes the fluid handling component coupler collar of FIG. 27.

FIG. 29 shows another example of how the coupler 300 can be used to conjoin two fluid handling components. In this example, the housing 185 of the male coupling 180 (as described above, e.g., see FIG. 23) is modified to use the coupler 300. Accordingly, the modified male coupling is referred to in FIG. 29 as male coupling 180', and the housing is referred to as: (i) main body housing 185a and (ii) termination housing 185b. In this example, the termination housing 185b includes a threaded termination portion 182' in contrast to the barbed termination portion 182 of the male coupling 180. Accordingly, this example shows how the coupler 300 can be readily used to facilitate the combination of differing types of termination portions in conjunction with the base design of the male coupling 180. This capability can thereby provide manufacturing efficiencies and/or user convenience (e.g., by allowing the user to select a desired style of termination portion). Moreover, in some embodiments the coupler 300 is reversible. Alternately, in some embodiments the coupler is non-reversible.

In the depicted example, the main body housing 185a and the termination housing 185b are conjoined (mechanically attached) by the coupler 300. In order for the mechanical attachment to be secure, each of the main body housing 185a and the termination housing 185b define one or more annular recesses that receive(s) the detainment elements of the first and second series of detainment elements 320a and 320b. In some embodiments, the annular recesses defined by the main body housing 185a and the termination housing 185b are each an annular groove (extending continuously, fully circumferentially). The illustration of male coupling 180' shows two detainment elements of the coupler 300 engaged in a recess defined by the main body housing 185a, but no detainment elements of the coupler 300 are shown as engaged in a recess defined by the termination housing 185b. That is the case simply because this cross-sectional view happens to cut through detainment elements that are engaged in the recess(es) defined by the main body housing 185a, but does not cut through the detainment elements that are engaged in the recess(es) defined by the termination housing 185b. While not visible in this illustration, there are in fact detainment elements that are engaged in the recess (es) defined by the termination housing 185b.

In the depicted embodiment, the coupler 300 allows for relative rotation of the main body housing 185a with respect to the termination housing 185b. Alternatively, in some embodiments the coupler 300 (and/or the housings 185a-b) can be configured to prevent or restrict such relative rotation. For example, in some embodiments the coupler 300 can include one or more keying elements that engage with one or more complementary structural elements of the body housing 185a and/or the termination housing 185b to prevent or restrict relative rotation. In another example, one or more of the detainment elements of the coupler 300 can be structurally different than other detainment elements, and that different detainment element(s) can be used to mate with one or more complementary structural element(s) (e.g., different type of recess, such as deeper) of the body housing 185a and/or the termination housing 185b to prevent or restrict relative rotation.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described herein should not be understood as requiring such separation in all embodiments, and it should be understood that the described program components and systems can generally be integrated together in a single product or packaged into multiple products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown to achieve desirable results. In certain implementations, multitasking and parallel processing may be advantageous.

What is claimed is:
1. A fluid coupling device, comprising:
 a fluid coupling housing with a first end defining a first opening leading to a coupling internal space defined within the fluid coupling housing;
 a termination portion extending from the fluid coupling housing on a second end of the fluid coupling housing that is opposite of the first end, the termination portion defining a second opening leading to the coupling internal space; and
 a fluid coupling module disposed within the coupling internal space, wherein the fluid coupling module comprises:
  a module housing defining a module internal space between a first end of the module housing and a second end of the module housing;
  a stem affixed to the module housing at the second end of the module housing and extending within the module internal space toward the first end of the module housing and along a longitudinal axis of the fluid coupling module; and
  a valve sleeve disposed between the stem and the module housing, wherein the valve sleeve is movable along the stem within the module internal space between: (i) a closed position in which the valve sleeve seals the first opening off from the second opening and (ii) an open position in which the first opening is fluidly connected to the second opening via the module internal space,
 wherein the first end of the module housing is abutted against a shoulder of the fluid coupling housing that defines the first opening of the fluid coupling housing.
2. The fluid coupling device of claim 1, further comprising an elastomeric seal disposed between the module housing and the fluid coupling housing.

3. The fluid coupling device of claim 1, further comprising:
- a first elastomeric seal disposed between the stem and the valve sleeve while the valve sleeve is in the closed position;
- a second elastomeric seal disposed between the valve sleeve and the module housing while the valve sleeve is in the closed position; and
- a third elastomeric seal disposed within the module internal space and positioned between the second elastomeric seal and the first opening.

4. The fluid coupling device of claim 3, wherein a majority of an inner diameter surface of the third elastomeric seal is spaced apart from the valve sleeve while the valve sleeve is in the closed position.

5. The fluid coupling device of claim 3, further comprising an annular spacer disposed between the second and third elastomeric seals.

6. The fluid coupling device of claim 1, wherein the stem comprises a base that is affixed to the module housing, and wherein the base defines one or more openings that fluidly connect the second opening to the module internal space.

7. The fluid coupling device of claim 6, wherein the one or more openings comprise four openings that are each shaped as a quarter circle.

8. The fluid coupling device of claim 1, wherein the stem comprises a base that is affixed to the module housing, and further comprising a spring disposed between the base and the valve sleeve that biases the valve sleeve toward the closed position.

9. The fluid coupling device of claim 1, further comprising a latch mechanism adjacent to the first opening, the latch mechanism transversely movable relative to the fluid coupling housing between: (i) a latched position in which a center of an opening defined by the latch mechanism is transversely offset in relation to a center of the first opening and (ii) an unlatched position in which the opening defined by the latch mechanism is concentric with the first opening.

10. The fluid coupling device of claim 9, further comprising a spring between the latch mechanism and the fluid coupling housing that biases the latch mechanism toward the latched position.

11. The fluid coupling device of claim 1, wherein the shoulder of the fluid coupling housing extends 360 degrees around the first opening of the fluid coupling housing.

12. A fluid coupling module comprising:
- a module housing defining an internal space and a longitudinal axis, the module housing including: (i) a first end defining a first end opening leading to the internal space and (ii) a second end defining a second end opening leading to the internal space;
- a stem including a base that is affixed to the second end of the module housing, the stem extending from the base along the longitudinal axis toward the first end; and
- a valve sleeve disposed between the stem and the module housing, wherein the valve sleeve is movable along the stem within the internal space between: (i) a closed position in which the valve sleeve seals the first end opening off from the second end opening and (ii) an open position in which the first end opening is fluidly connected to the second end opening via a fluid flow path,
- wherein the fluid coupling module is a cartridge configured to be modularly incorporated in a variety of different form factors of fluid couplings or housings, and
- wherein, when the valve sleeve is in the open position, the fluid flow path extends between an inner diameter of the valve sleeve and an outer diameter of the stem.

13. The fluid coupling module of claim 12, wherein the base defines openings that fluidly connect the second end opening to the internal space.

14. The fluid coupling module of claim 13, wherein the openings comprise four openings that are each shaped as a quarter circle.

15. The fluid coupling module of claim 12, wherein the stem further comprises a head on an end of the stem opposite of the base, and wherein the head defines an annular seal groove.

16. The fluid coupling module of claim 15, further comprising:
- a first elastomeric seal disposed within the annular seal groove and in contact with an inner diameter of the valve sleeve while the valve sleeve is in the closed position;
- a second elastomeric seal disposed between an outer diameter of the valve sleeve and the module housing while the valve sleeve is in the closed position; and
- a third elastomeric seal disposed within the module internal space and positioned between the second elastomeric seal and the first end.

17. The fluid coupling module of claim 16, further comprising an annular spacer disposed between the second and third elastomeric seals, and in contact with each of the second and third elastomeric seals.

18. The fluid coupling module of claim 12, further comprising a spring disposed between the base and the valve sleeve that biases the valve sleeve toward the closed position.

19. A fluid coupling device, comprising:
- a fluid coupling housing defining a first opening leading to a coupling internal space defined within the fluid coupling housing and a second opening leading to the coupling internal space; and
- the fluid coupling module of claim 12 disposed within the coupling internal space.

* * * * *